US008572220B2

(12) United States Patent
O'Leary et al.

(10) Patent No.: US 8,572,220 B2
(45) Date of Patent: Oct. 29, 2013

(54) SYSTEM AND METHOD FOR MANAGING CONFIGURATIONS OF NCPI DEVICES

(75) Inventors: John O'Leary, Newport, RI (US); Carl Joseph Meiser, III, East Greenwich, RI (US); Brian Christopher Behbehani, Providence, RI (US); Jon Robert Runk, North Smithfield, RI (US); David Michael Aharonian, Cranston, RI (US); Scott M. Rymeski, Providence, RI (US)

(73) Assignee: Schneider Electric IT Corporation, West Kingston, RI (US)

( * ) Notice: Subject to any disclaimer, the term of this patent is extended or adjusted under 35 U.S.C. 154(b) by 196 days.

(21) Appl. No.: 12/432,219

(22) Filed: Apr. 29, 2009

(65) Prior Publication Data

US 2010/0281147 A1    Nov. 4, 2010

(51) Int. Cl.
G06F 15/177    (2006.01)
(52) U.S. Cl.
USPC ........... 709/222; 709/223; 709/224; 709/203; 709/220
(58) Field of Classification Search
USPC .................... 709/222, 224, 203, 220, 223
See application file for complete search history.

(56) References Cited

U.S. PATENT DOCUMENTS

| 6,139,177 | A  | 10/2000 | Venkatraman et al. |
| 6,170,007 | B1 | 1/2001  | Venkatraman et al. |
| 6,686,838 | B1 | 2/2004  | Rezvani et al. |
| 6,704,401 | B2 | 3/2004  | Piepho et al. |
| 7,065,533 | B2 | 6/2006  | Arrouye et al. |
| 7,206,824 | B2 | 4/2007  | Somashekar et al. |
| 7,698,389 | B2 | 4/2010  | Sesek et al. |
| 2002/0124081 | A1* | 9/2002 | Primm et al. ................. 709/224 |
| 2002/0161885 | A1* | 10/2002 | Childers et al. ............. 709/224 |
| 2006/0047798 | A1* | 3/2006 | Feinleib et al. .............. 709/223 |
| 2007/0038414 | A1* | 2/2007 | Rasmussen et al. ............ 703/1 |
| 2007/0078635 | A1* | 4/2007 | Rasmussen et al. ............ 703/1 |
| 2009/0210755 | A1* | 8/2009 | Sawczak et al. ............. 714/57 |
| 2010/0010688 | A1* | 1/2010 | Hunter ......................... 700/300 |
| 2011/0202655 | A1* | 8/2011 | Sharma et al. .............. 709/224 |

FOREIGN PATENT DOCUMENTS

| EP | 1976189 A2 | 10/2008 |
| JP | 2005303544 A | 10/2005 |
| WO | 9804067 A1 | 1/1998 |

OTHER PUBLICATIONS

Management Strategy for Network Critical Physical Infrastructure, White Paper #100, 2003, pp. 1-10, published on internet, American Power Conversion.
Partial International Search Report (dated Aug. 20, 2010) in International Patent Application No. PCT/US2010/032566.

* cited by examiner

*Primary Examiner* — Ruolei Zong
*Assistant Examiner* — Benjamin M. Thieu
(74) *Attorney, Agent, or Firm* — Lando & Anastasi, LLP

(57) ABSTRACT

A system and method for configuring network critical physical infrastructure (NCPI) devices is provided. In one example, a method is provided including acts of gathering, by a data center management appliance, at least one device configuration from an NCPI device via a network, modifying the at least one device configuration and providing the modified at least one device configuration to the NCPI device via the network. In another example, a data center management appliance is provided that includes a storage medium, a network interface and a controller coupled to the storage medium and the network interface and configured to gather at least one device configuration from a first NCPI device via the network interface, modify the at least one device configuration and provide the modified at least one device configuration to the first NCPI device via the network interface.

18 Claims, 15 Drawing Sheets

SYSTEM AND METHOD FOR MANAGING CONFIGURATIONS OF NCPI DEVICES

BACKGROUND

1. Field of the Invention

At least one example in accord with the present invention relates generally to systems and methods for data center management, and more specifically, to systems and methods for managing the configuration of Network Critical Physical Infrastructure (NCPI) devices.

2. Discussion of Related Art

In response to the increasing demands of information-based economies, information technology networks continue to proliferate across the globe. One manifestation of this growth is the centralized network data center. A centralized network data center typically consists of various information technology equipment, collocated in a structure that provides network connectivity, electrical power and cooling capacity. Often the equipment is housed of specialized enclosures termed "racks" which integrate these communications, power and cooling elements. In some data center configurations, rows of racks are organized into hot and cold aisles to decrease the cost associated with cooling the information technology equipment. These characteristics make data centers a cost effective way to deliver the computing power required by many software applications.

Various processes and software applications, such as the InfraStruXure® Central product available from American Power Conversion by Schneider Electric of West Kingston, R.I., (APC) have been developed to aid data center personnel in configuring the operational behavior of NCPI devices located within a data center. Some of these tools allow users to adjust values assigned to one or more locally-stored, pre-defined settings of the NCPI device, and thereby affect how the NCPI device operates. Typically, these local, predefined settings were limited to a subset of the overall settings available for the NCPI device.

SUMMARY OF THE INVENTION

Aspects in accord with the present invention manifest an appreciation that data center personnel would benefit from greater flexibility in configuring NCPI devices than is available using conventional technology. According to one example, a method for configuring an NCPI device using a data center management appliance is provided. The method includes acts of gathering, by the data center management appliance, at least one device configuration from a first NCPI device via a network, modifying the at least one device configuration and providing the modified at least one device configuration to the first NCPI device via the network.

In the method, the act of gathering, by the data center management appliance, the at least one device configuration may include an act of copying at least one configuration file from the first NCPI device. Additionally, the act of gathering, by the data center management appliance, the at least one device configuration from the first NCPI device may include an act of gathering the at least one device configuration from an uninterruptible power supply (UPS). The method may further include an act of storing the modified at least one device configuration in data storage.

Continuing this example, the method may further include an act of providing the modified at least one device configuration to a second NCPI device. In the method, the act of providing the modified at least one device configuration to the first NCPI device may include an act of providing the modified at least one device configuration to a UPS and the act of providing the modified at least one device configuration to a second NCPI device may include providing the modified at least one device configuration to a power distribution unit (PDU). Additionally, in the method, the act of providing the modified at least one device configuration to the UPS may include an act of providing a configuration file including operational parameters common to the UPS and the PDU.

According to another example, a data center management appliance for configuring an NCPI device is provided. The data center management appliance includes a storage medium, a network interface and a controller coupled to the storage medium and the network interface. The controller is configured to gather at least one device configuration from a first NCPI device via the network interface, modify the at least one device configuration and provide the modified at least one device configuration to the first NCPI device via the network interface. The controller may be further configured to copy at least one configuration file from the first NCPI device. Additionally, the controller may be further configured to gather the at least one device configuration from an uninterruptible power supply (UPS). Moreover, the controller may be configured to store the modified at least one device configuration on the storage medium. In addition, the controller may be configured to provide the modified at least one device configuration to a second NCPI device. Furthermore, the controller may be further configured to provide a configuration file including operational parameters common to a UPS and a PDU.

According to another example, a method for automatically configuring an NCPI device using a data center management appliance is provided. The method includes acts of defining a configuration policy, the configuration policy having an associated NCPI device configuration, determining, by the data center management appliance, at least one NCPI device subject to the NCPI device configuration policy and providing the associated NCPI device configuration to the at least one NCPI device subject to the NCPI device configuration policy. In the method, the act of defining the configuration policy may include an act of defining a configuration policy applicable to the at least one NCPI based on the physical location of the at least one NCPI device. Additionally, in the method, the act of providing the associated NCPI device configuration may include an act of copying at least one configuration file to the at least one NCPI device. Moreover, the act of providing the associated NCPI device configuration may include an act of providing the associated NCPI device configuration to an uninterruptible power supply (UPS).

Continuing this example, in the method, the act of defining the configuration policy may include an act of specifying an event an occurrence of which triggers application of the configuration policy and the method may further include determining that the event has occurred prior to performing the act of determining, by the data center management appliance, the at least one NCPI device subject to the NCPI device configuration policy. Additionally, in the method, the act of defining the configuration policy may include an act of defining a configuration policy applicable to at least two NCPI devices being of different functional types. Moreover, in the method, the act of defining the configuration policy applicable to the at least two NCPI devices may include an act of defining a configuration policy that is applicable to a UPS and a computer room air conditioner.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
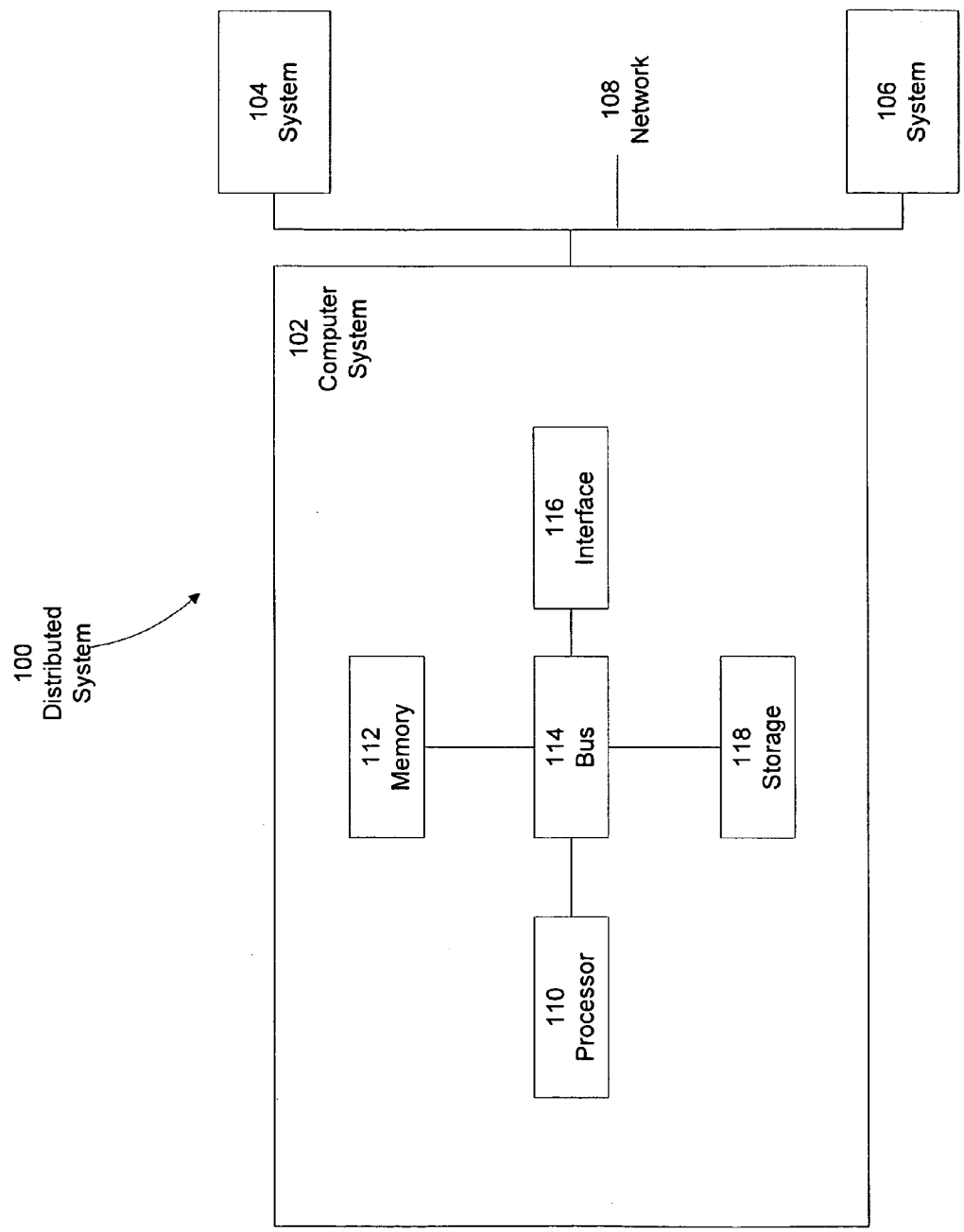
FIG. 1 shows an example computer system with which various aspects in accord with the present invention may be implemented.

At least some examples in accord with the present invention relate to systems and processes through which a user configures NCPI devices. An NCPI device may include any device used to provide physical resources, such as power and cooling, and monitoring services, such as environmental and security monitoring, to equipment housed within a data center. Examples of NCPI devices include generators, uninterruptible power supplies (UPSs), transformers, power distribution units (PDUs), outlets, computer room air handlers (CRAHs), rack-mounted air conditioners (RMACs), computer room air conditioners (CRACs), environmental sensors, such as temperature, humidity and airflow sensors, and security devices, such as security cameras, door contact sensors and the like. While NCPI devices may include enough computing resources to control the operation of the NCPI device, these computing resources are limited and tailored to support the operation of the NCPI devices. In at least one example, these limited computer resources may be disposed upon a Network Management Card (NMC) such as a UPS NMC available from APC.

The aspects disclosed herein, which are in accord with the present invention, are not limited in their application to the details of construction and the arrangement of components set forth in the following description or illustrated in the drawings. These aspects are capable of assuming other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other example.

For instance, according to one example, a computer system is configured to perform any of the functions described herein, including but not limited to, configuring NCPI devices. However, such a system may also perform other functions such as presenting a user interface to allow a user to administer configuration policies. Moreover, the systems described herein may be configured to include or exclude any of the functions discussed herein. Thus the invention is not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Computer System

Various aspects and functions described herein in accord with the present invention may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects in accord with the present invention may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, the invention is not limited to executing on any particular system or group of systems. Further, aspects may be implemented in software, hardware or firmware, or any combination thereof. Thus, aspects in accord with the present invention may be implemented within methods, acts, systems, system elements and components using a variety of hardware and software configurations, and the invention is not limited to any particular distributed architecture, network, or communication protocol.

FIG. 1 shows a block diagram of a distributed computer system 100, in which various aspects and functions in accord with the present invention may be practiced. Distributed computer system 100 may include one more computer systems. For example, as illustrated, distributed computer system 100 includes computer systems 102, 104 and 106. As shown, computer systems 102, 104 and 106 are interconnected by, and may exchange data through, communication network 108. Network 108 may include any communication network through which computer systems and NCPI devices may exchange data. To exchange data using network 108, computer systems 102, 104 and 106 and network 108 may use various methods, protocols and standards, including, among others, token ring, ethernet, wireless ethernet, Bluetooth, TCP/IP, UDP, Http, FTP, SNMP, SMS, MMS, SS7, Json, Soap, Corba, REST and Web Services. To ensure data transfer is secure, computer systems 102, 104 and 106 may transmit data via network 108 using a variety of security measures including TSL, SSL or VPN, among other security techniques. While distributed computer system 100 illustrates three networked computer systems, distributed computer system 100 may include any number of computer systems and computing devices, networked using any medium and communication protocol.

Various aspects and functions in accord with the present invention may be implemented as specialized hardware or software executing in one or more computer systems including computer system 102 shown in FIG. 1. As depicted, computer system 102 includes processor 110, memory 112, bus 114, interface 116 and storage 118. Processor 110 may perform a series of instructions that result in manipulated data. Processor 110 may be a commercially available processor such as an Intel Xeon, Itanium, Core, Celeron, Pentium, AMD Opteron, Sun UltraSPARC, IBM Power5+, or IBM mainframe chip, but may be any type of processor, multiprocessor or controller. Processor 110 is connected to other system elements, including one or more memory devices 112, by bus 114.

Memory 112 may be used for storing programs and data during operation of computer system 102. Thus, memory 112 may be a relatively high performance, volatile, random access memory such as a dynamic random access memory (DRAM) or static memory (SRAM). However, memory 112 may include any device for storing data, such as a disk drive or other non-volatile storage device. Various examples in accord with the present invention may organize memory 112 into particularized and, in some cases, unique structures to perform the aspects and functions disclosed herein.

Components of computer system 102 may be coupled by an interconnection element such as bus 114. Bus 114 may include one or more physical busses, for example, busses between components that are integrated within a same machine, but may include any communication coupling between system elements including specialized or standard computing bus technologies such as IDE, SCSI, PCI and InfiniBand. Thus, bus 114 enables communications, for example, data and instructions, to be exchanged between system components of computer system 102.

Computer system 102 also includes one or more interface devices 116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118 may include a computer readable and writeable nonvolatile data storage medium in which instructions are stored that define a program to be executed by the processor. Storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor or some other controller may cause data to be read from the nonvolatile recording medium into another memory, such as memory 112, that allows for faster access to the information by the processor than does the storage medium included in storage system 118. The memory may be located in storage system 118 or in memory 112, however, processor 110 may manipulate the data within the memory 112, and then copy the data to the medium associated with storage system 118 after processing is completed. A variety of components may manage data movement between the medium and integrated circuit memory element and the invention is not limited thereto. Further, the invention is not limited to a particular memory system or storage system.

Although computer system 102 is shown by way of example as one type of computer system upon which various aspects and functions in accord with the present invention may be practiced, aspects of the invention are not limited to being implemented on the computer system as shown in FIG. 1. Various aspects and functions in accord with the present invention may be practiced on one or more computers having a different architectures or components than that shown in FIG. 1. For instance, computer system 102 may include specially-programmed, special-purpose hardware, such as for example, an application-specific integrated circuit (ASIC) tailored to perform a particular operation disclosed herein. While another example may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular implementation.

The processor and operating system together define a computer platform for which application programs in high-level programming languages may be written. These component applications may be executable, intermediate, bytecode or interpreted code which communicates over a communication network, for example, the Internet, using a communication protocol, for example, TCP/IP. Similarly, aspects in accord with the present invention may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accord with the present invention may be implemented in a non-programmed environment, for example, documents created in HTML, XML or other format that, when viewed in a window of a browser program, render aspects of a graphical-user interface or perform other functions. Further, various examples in accord with the present invention may be implemented as programmed or non-programmed elements, or any combination thereof. For example, a web page may be implemented using HTML while a data object called from within the web page may be written in C++. Thus, the invention is not limited to a specific programming language and any suitable programming language could be used.

Examples in accord with the present invention may perform functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from Sun Microsystems of Santa Clara, Calif. or integration software such as Web Sphere middleware from IBM of Armonk, N.Y. However, a computer system running, for example, SQL Server may be able to support both aspects in accord with the present invention and databases for sundry applications not within the scope of the invention.

Example System Architecture

Figure 2:
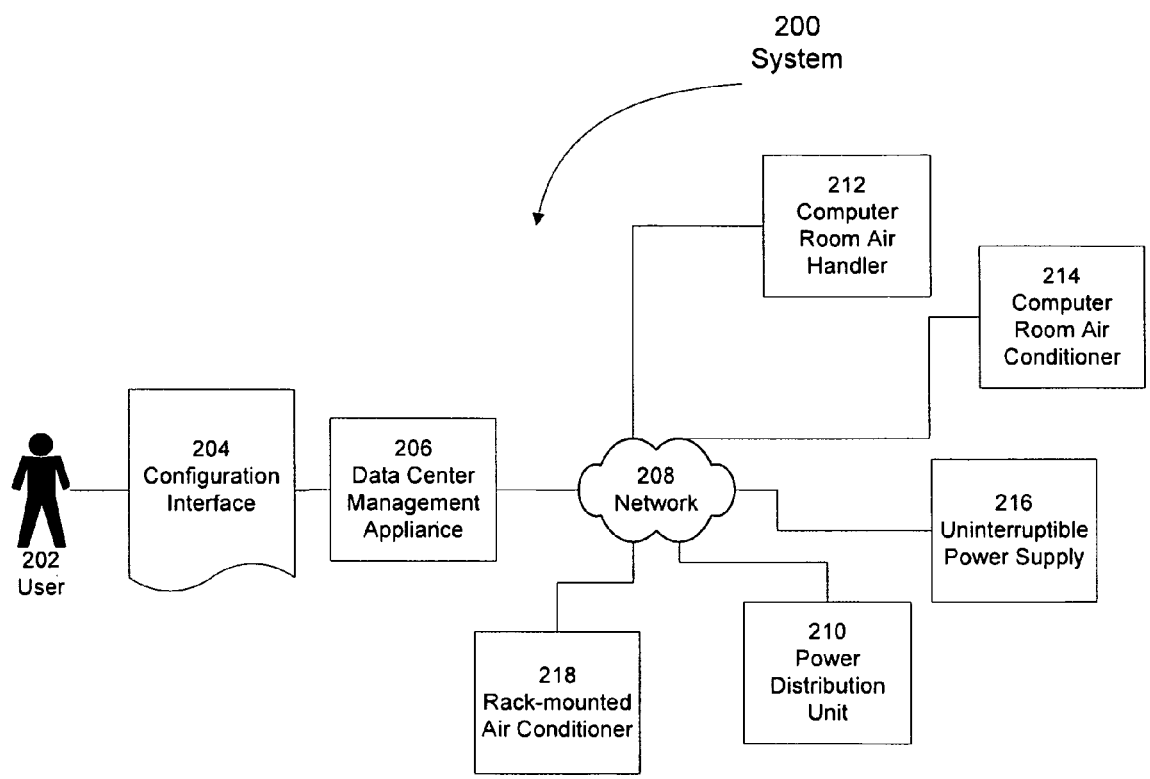
FIG. 2 illustrates an example distributed system in accord with the present invention.

FIG. 2 presents a context diagram including physical and logical elements of distributed system 200. As shown, distributed system 200 is specially configured in accord of the present invention. The system structure and content recited with regard to FIG. 2 is for exemplary purposes only and is not intended to limit the invention to the specific structure shown in FIG. 2. As will be apparent to one of ordinary skill in the art, many variant system structures can be architected without deviating from the scope of the present invention. The particular arrangement presented in FIG. 2 was chosen to promote clarity.

Information may flow between the elements, components and subsystems depicted in FIG. 2 using any technique. Such techniques include, for example, passing the information over the network via TCP/IP, passing the information between modules in memory and passing the information by writing to a file, database, or some other non-volatile storage device. Other techniques and protocols may be used without departing from the scope of the invention.

Referring to FIG. 2, a system 200 includes a user 202, a configuration interface 204, a data center management appliance 206, a communications network 208, a set of NCPI devices, namely a PDU 210, a CRAH 212, a CRAC 212, a UPS 216 and a RMAC 218. The system 200 allows the user 202, such as a data center technician or other data center personnel, to interact with the configuration interface 204 to create or modify an NCPI device configuration or a device configuration policy. An NCPI device configuration specifies one or more values for one or more operational parameters that affect the manner in which the NCPI device operates. For example, with reference to FIG. 2, a device configuration for the UPS 216 may include values for operational parameters that specify the upper and lower transfer points, frequency tolerance and sensitivity to power changes for the UPS 216. Thus device configurations provide an organized set of operational parameters that may be targeted to the particular operational parameters and characteristics of specific NCPI devices and that can define the behavior of the NCPI device from an overall, operational perspective.

A device configuration policy may associate one or more NCPI devices with one or more NCPI device configurations. Associations between a device configuration and one or more NCPI devices may be based on a variety of NCPI device characteristics including, among others, the physical location of the NCPI device, a logical group to which the NCPI device belongs, the functional type of the NCPI device and a network segment in which the NCPI device is included. As discussed further below, some examples in accord with the present invention automatically apply device configuration policies to detected NCPI devices. For example, with reference to FIG. 2, the data center management appliance 206 may apply a device configuration policy that sets the target air temperature of RMAC 218 based on its physical location in the data center.

According to one example, the configuration interface 204 includes facilities, such as, for example, code, data, data structures or objects, configured to exchange configuration information with the user 202. This information may include indications of which NCPI devices the user 202 wishes to configure, the values to assign to specific operational parameters within a given device configuration and indications of which device configurations to save locally on the data center management appliance 206. The features of the configuration interface 204, as may be found in various examples in accord with the present invention, are discussed further below.

As shown in FIG. 2, the data center management appliance 206 presents the configuration interface 204 to the user 202. A data center management appliance is a specialized computing device engineered to provide data center design, monitoring and configuration services. According to one example, the data center management appliance 206 is an InfraStruXure® Central Server appliance available from APC by Schneider. As illustrated, the data center management appliance 206 may exchange information with the NCPI devices accessible via the network 208. This information may include any information required to support the features and functions of the data center management appliance 206. For example, this information may include configuration information, such as one or more device configurations.

According to various examples, the data center management appliance 206 includes facilities configured to produce a number device configurations targeted for a variety of NCPI devices. In one example, the data center management appliance 206 includes facilities configured to produce a single device configuration that may be used to setup multiple NCPI devices. For instance, the data center management appliance 206 may produce a single device configuration covering both the CRAC 214 and the RMAC 218. In this example, the single device configuration may indicate values for operational parameters that are a union of the operational parameters supported by the multiple NCPI devices. Alternatively, the single device configuration may indicate values for operational parameters that are an intersection of the operational parameters supported by the multiple NCPI devices. In another example, the data center management appliance 206 may produce a separate device configuration for each NCPI device accessible via the network 208. In this example, each device configuration may indicate values for operational parameters that are specific to one NCPI device.

In various examples, each NCPI device may store a device configuration within a configuration file. These configuration files may include name, value tuples that specify the values to be assigned to operational parameters. In some examples, the data center management appliance 206 includes facilities configured to modify and store configuration files and to exchange (i.e. receive or provide) configuration files with NCPI devices. In one example, the data center management appliance 206 may exchange configuration files with NCPI devices using FTP or secure FTP, although other file transfer protocols may be employed without departing from the scope of the invention.

According to other examples, the data center management appliance 206 includes facilities configured to apply one or more NCPI device configuration policies. In some examples, the data center management appliance 206 stores a list of NCPI devices and their characteristics. In these examples, the data center management appliance 206 includes facilities configured to determine that particular NCPI devices are subject to one or more configuration policies by matching the NCPI device attributes targeted by the configuration policies to the characteristics of NCPI devices included in the list.

Further, in these examples, the data center management appliance 206 has facilities configured to provide device configurations associated with device configuration policies to NCPI devices that are subject to the configuration policies. In one example, the data center management appliance 206 provides device configurations to NCPI devices by copying configuration files to the NCPI devices using FTP. In addition, in some examples, the data center management appliance 206 includes facilities configured to apply policies in response to events such as, among other events, detection of a new NCPI device on the network 208, receiving a request from the user 202 or on a periodic basis.

Information, including NCPI device configuration policies, may be stored on the data center management appliance 206 in any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

Configuration Interface Examples

According to various examples, configuration interface 204 may provide users with a high degree of flexibility regarding how and when they configure NCPI devices. In these examples, the user 202 may modify, using the configuration interface 204, device configurations that are locally stored on the data center management appliance 206. In addition, the user 202 may cause the data center management appliance 206 to exchange device configurations with the NCPI devices via the network 208. Thus, configuration interface 204 may be used to design new device configurations or may be used to retrieve an existing device configuration from one NCPI device, create a new device configuration based on the retrieved device configuration and copy the new device configuration to one or more NCPI devices. The formulation of useful systems and methods for conducting these configuration activities is impacted by the unique manner in which the configuration interface 204 may be structured and organized. Conversely, the elements used and acts performed in these configuration activities impact the attributes and facilities of this example of the configuration interface 204.

Figure 3:
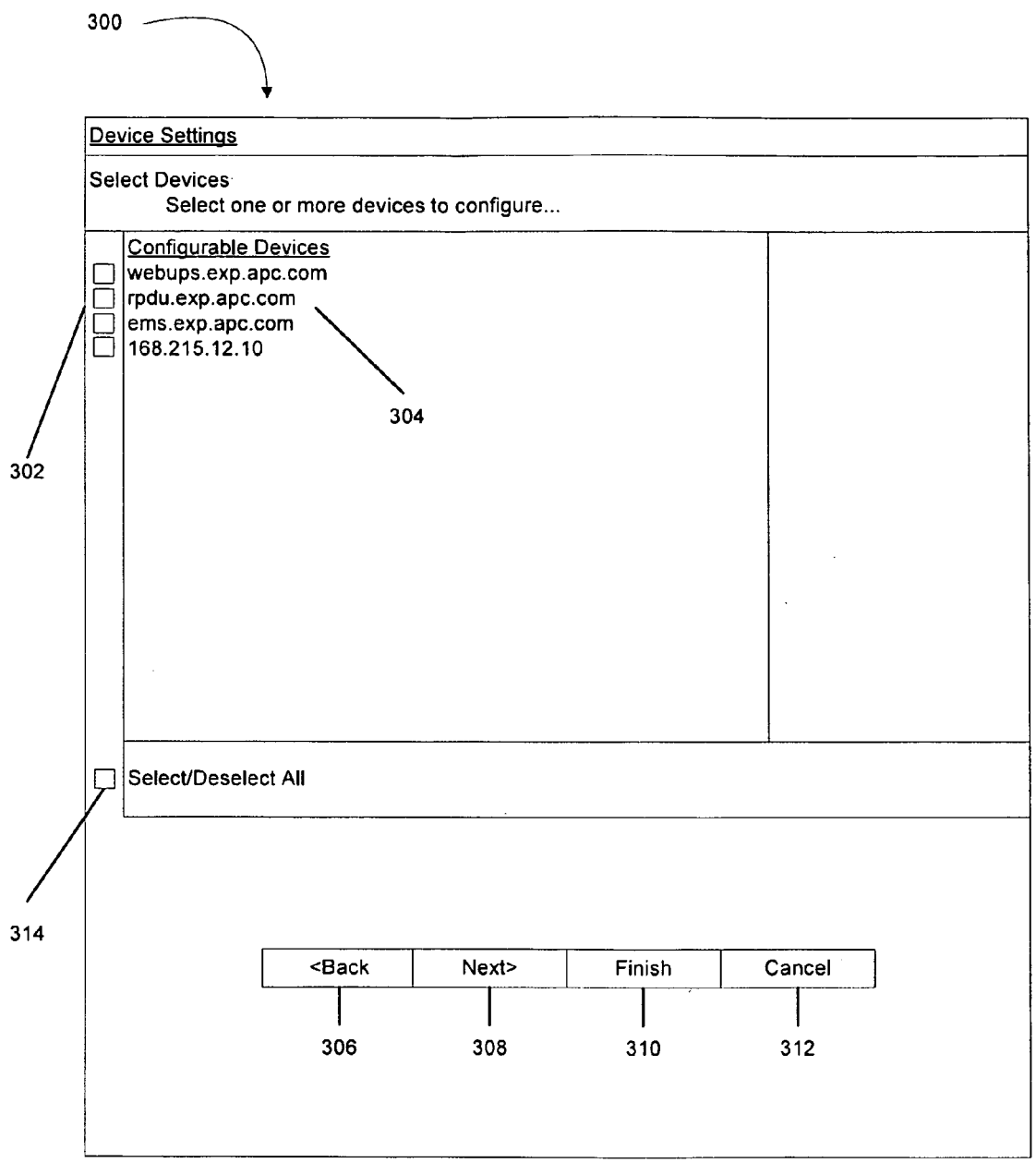
FIG. 3 depicts an example interface through which a user may configure an NCPI device.

The configuration interface 204 may provide functionality through a variety of user interface screens and elements that guide the user 202 through a process of configuring NCPI devices. FIGS. 3-7 illustrate a set of example user interface screens that may be included within the configuration interface 204. Turning to FIG. 3, a user interface screen 300 includes individual selection elements 302, an NCPI device list 304, a select all element 314 and a set of user interface navigation elements, namely a back element 306, a next element 308, a finish element 310 and a cancel element 312.

With combined reference to FIGS. 2 and 3, the user interface screen 300 includes facilities configured to gather the NCPI device list 304 by determining the NCPI devices that are accessible via the network 208. As shown, the NCPI devices may be indicated in a variety of ways including by displaying the name or the IP address associated with the NCPI device. According to one example, the facilities that gather the list of NCPI devices query NCPI device information stored locally within the data center management appliance 206. In this example, the data center management appliance 206 also includes facilities configured to maintain the currency of the NCPI device information, such as event driven components that detect changes to the set of NCPI devices that are accessible via the network 208 and that modify the locally stored NCPI device information appropriately. In another example, the list gathering facilities of the user interface 300 search the network 208 for accessible NCPI devices when the user 202 opens the user interface screen 300.

Continuing the illustrated example, the user interface screen 300 also includes facilities configured to accept indications of one or more members of the NCPI device list 304 that will be subject to further configuration processing. As shown, both the individual selection elements 302 and the select all element 314 are configured to toggle between selected and not selected states when actuated by the user 202. According to this example, the configuration interface 204 is configured to further process any member of the NCPI device list 304 adjacent to a selected individual selection element. In addition, as shown, the configuration interface 204 is configured to further process all of the members of the NCPI device list 304 when the select all element 314 is selected.

In this example of the configuration interface 204, the navigation elements 306, 308, 310 and 312 are common to the user interface screens illustrated in FIGS. 3-7. In each of these user interface screens, the navigation elements are configured to allow the user 202 to navigate the configuration interface 204. For example, the back element 306 is configured to display the previously displayed user interface screen when actuated by the user 202. Conversely, the next element 308 is configured to display the subsequent user interface screen when actuated by the user 202. Also as shown, the cancel element 312 is configured to discontinue processing by the configuration interface 204 when actuated by the user 202.

In this example, the finish element 310 is configured to provide a new or modified device configuration to the NCPI devices selected for configuration. In some examples, this provision may take the form of a configuration file transfer using a variety of protocols, such as FTP or secure FTP. In other examples, the modified device configuration may be provided using message based protocol, such as HTTP, and examples are not limited to any particular technique of providing device configurations.

In various examples, each of the user interface screens include facilities configured to enable or disable particular navigation elements to suit the needs of the interface screen. In one example, the user interface 300 disables both the back element 306 and the finish element 310. In addition, each of the navigation elements may include additional facilities configured to allow for processing that is specific to the user interface screen in which the navigation element is actuated. For instance, in one example where the back element 306 is enabled by the user interface 300, the back element 306 is configured to cause the user interface screen 300 to reinitialize, rather than to navigate to a previous user interface screen. In some examples, this reinitialization may cause the user interface screen to repopulate the NCPI device list 304.

In the example shown in FIG. 3, the next element 308, when actuated by the user 202 on the interface screen 300, is additionally configured to gather a device configuration of each member of the NCPI device list 304 that is currently selected for further processing. According to this example, the next element 308 is configured to request or retrieve a current device configuration from some or all of the selected members of the NCPI device list 304 via the network 208. In one example, the user interface 300 may display a progress bar (not shown) to provide the user 202 feedback regarding the retrieval process. According to another example, the facilities included in the next element 308 may verify that a device configuration locally stored on the data center management appliance 206 is current prior to requesting a current device configuration via the network 208. Additionally, in at least one example, the next element 308 is configured to complete the gathering process prior to navigating to subsequent user interface screen 400.

Figure 4:
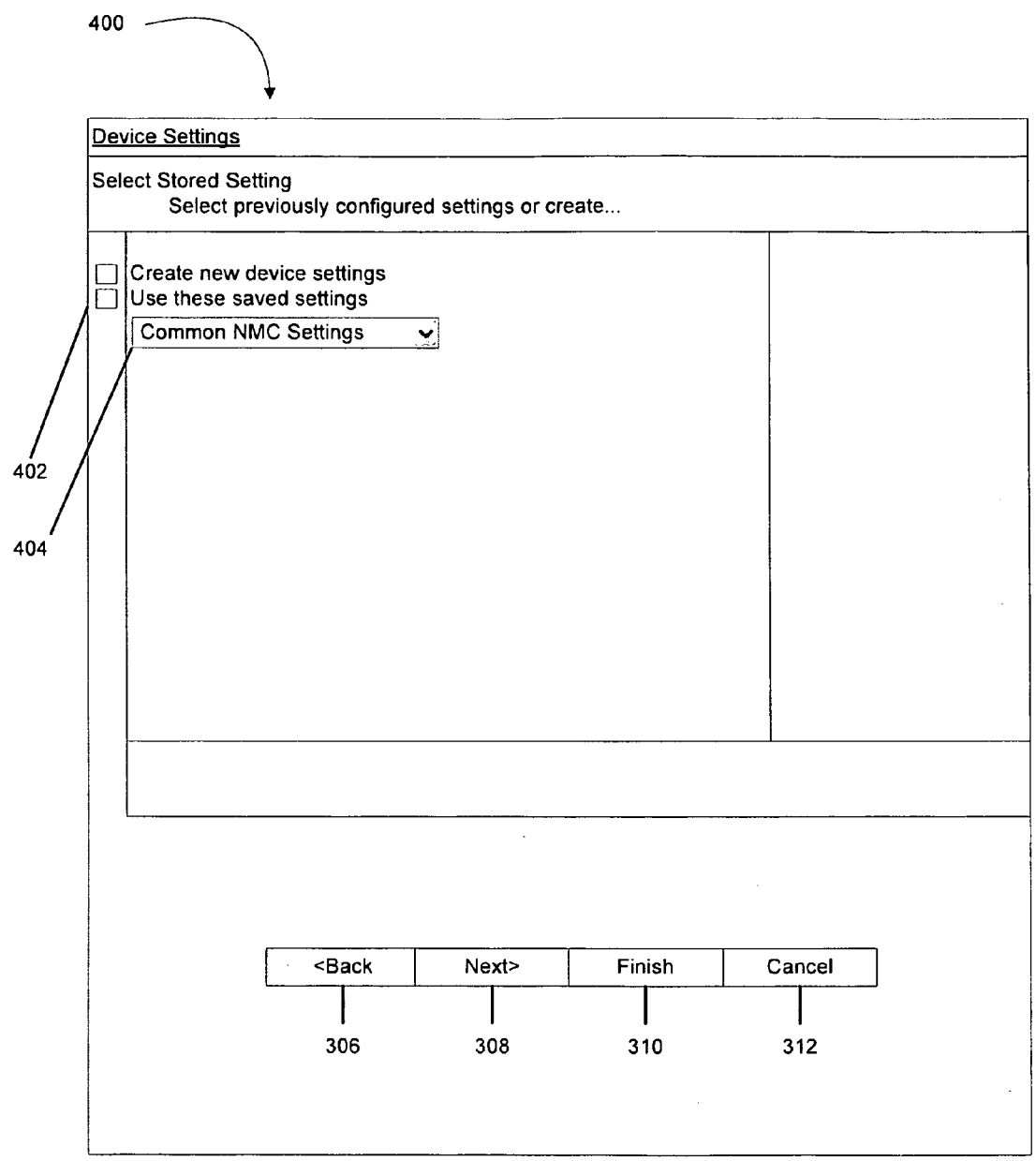
FIG. 4 shows another example interface through which a user may configure an NCPI device.

FIG. 4 depicts the user interface screen 400 that has facilities configured to indicate a device configuration to be modified into a new device configuration. As shown, FIG. 4 includes selection group 402, NCPI configuration selector 404 and the navigation elements 306, 308, 310 and 312. In one example, the finish element 310 is disabled by the user interface screen 400. In the example shown, the selection group 402 includes two individual selection elements and is configured to change the state of one of the individual selection elements to a selected state when that individual selection element is actuated by the user 202. In addition, the selection group 402 is configured to change the state of the individual selection element that is not actuated by the user 202 to a de-selected state. According to this example, the selection group 402 is configured to receive a selection of the device configuration that will be modified to form a new device configuration. As shown, the selections include a selection to create a new device configuration from a default device configuration and a selection to modify a device configuration stored locally on the data center management appliance 206.

The user interface screen 400 also contains facilities to activate the NCPI configuration selector 404 when the member of the selection group 402 proximal the NCPI configuration selector 404 is in a selected state. The NCPI configuration selector 404 is configured to display, when actuated by the user 202, a list of NCPI device configurations that are locally stored on the data center management appliance 206. In this example, the NCPI configuration selector 404 is also configured to display, as currently selected, an NCPI device configuration when the user 202 selects that NCPI device configuration from the list. In addition, in this example, the user interface screen 400 is configured to deactivate the NCPI configuration selector 404 when the member of the selection group 402 proximal the NCPI configuration selector 404 is not in a selected state.

Within the context of the user interface screen 400, the next element 308 includes additional facilities to provide the currently indicated device configuration to the subsequent user interface screen 500. In various examples, this provision may take the form of a file handle, pointer or some other reference to the indicated device configuration. In addition, in at least one example, when the currently indicated device configuration is a new device configuration, the provision facilities may be configured to provide a reference to null to indicate that the user interface screen 500 should create a default device configuration for further modification. In another example, the next element 308 is configured to create the default device configuration and provide a reference to the default device configuration to the user interface screen 500.

Figure 5:
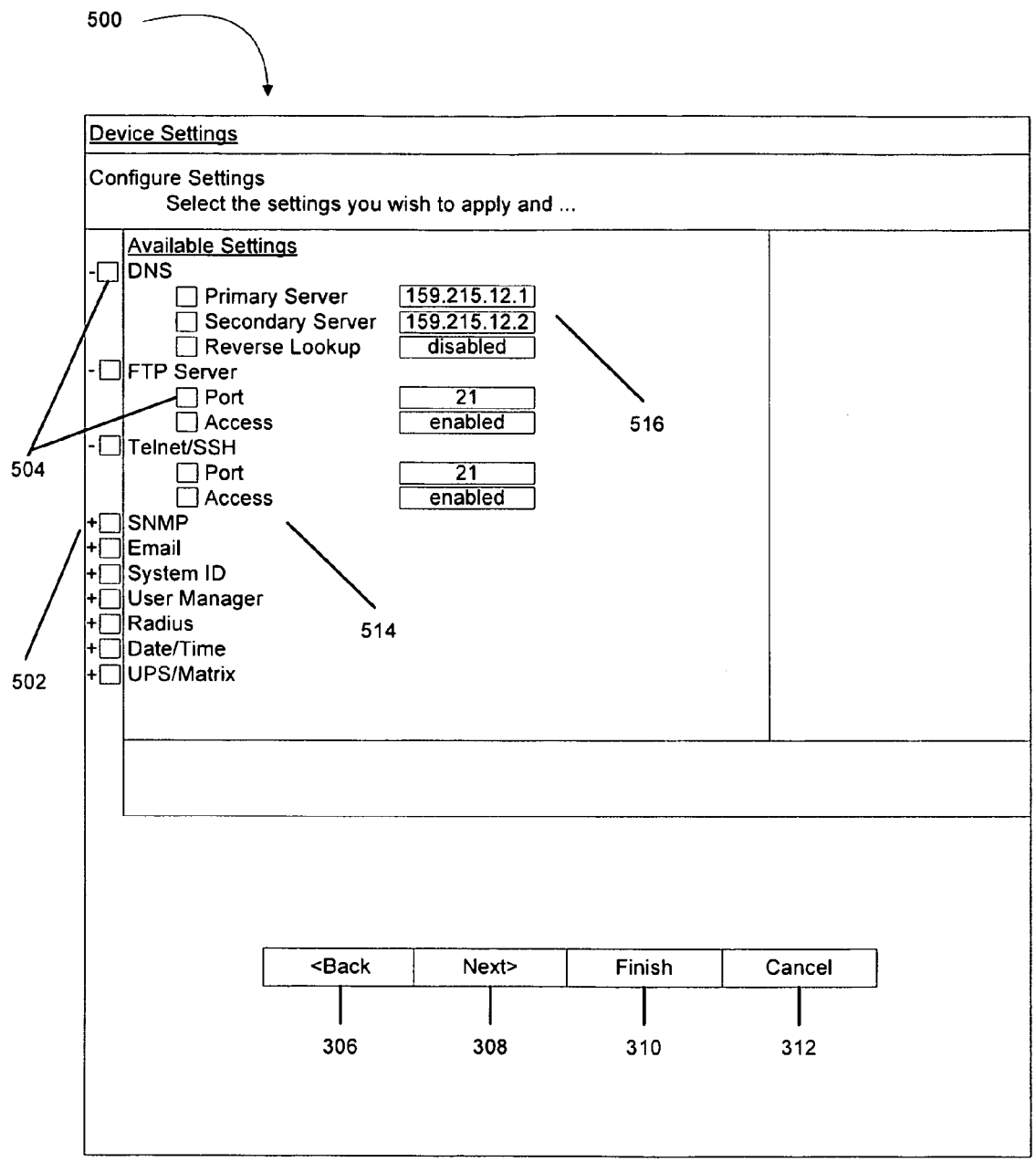
FIG. 5 illustrates another example interface through which a user may configure an NCPI device.

FIG. 5 shows the user interface screen 500 that includes facilities configured to adjust both the operational parameters included in the selected device configuration and the values associated with the included operational parameters. As shown, the user interface screen 500 includes collapsible elements 502, individual selection elements 504, operational parameter indicators 514, value elements 516 and the navigation elements 306, 308, 310 and 312. In one example, the finish element 310 is disabled by the user interface screen 500. In the example shown, the collapsible elements 502 denote logical groupings of the operational parameters 514 and are configured to expand or collapse when actuated by the user 202. As depicted, the facilities of the user interface screen 500 are configured to display the operational parameters 514 included within the logical groupings associated with expanded members of the collapsible elements 502. Additionally, in this example, the facilities of the user interface screen 500 are configured to hide the operational parameters included within the logical groupings associated with collapsed members.

In one example, the user interface screen 500 includes facilities that base the manner in which the operational parameters 514 are logically grouped and the specific operational parameters 514 that are listed on the device configuration selected for modification. In another example, these facilities base the logical groupings and operational parameters 514 listed on a default device configuration. Additionally, in another example, these facilities base the logical groups and operational parameters 514 displayed on a map that associates the components of a device configuration with the logical groups and operational parameters 514. In yet another example, the facilities of the user interface 500 display only the logical groups and operational parameters 514 that are common to all of the NCPI devices selected for configuration in the user interface screen 300. Alternatively, in another example, these facilities may display all logical groups and operational parameters 514, but may also disable those that are not common to all of the NCPI device selected for configuration.

With continued reference to FIG. 5, individual selection elements 504 are configured to indicate particular logical groups of operational parameters 514 and particular operational parameters 514 for inclusion in the modified device configuration. In addition, as shown, the value elements 516 are configured to accept and display indications of values to be assigned to the particular operational parameter 514 adjacent to the value elements 516.

Within the context of the user interface screen 500, the next element 308 includes additional facilities to provide the currently modified device configuration to the subsequent user interface screen 600. In various examples, this provision may take the form of a file handle, pointer or some other reference to the indicated device configuration. In one example, the currently modified device configuration is stored in a temporary configuration file and a reference to that file is passed to the user interface screen 600.

Figure 6:
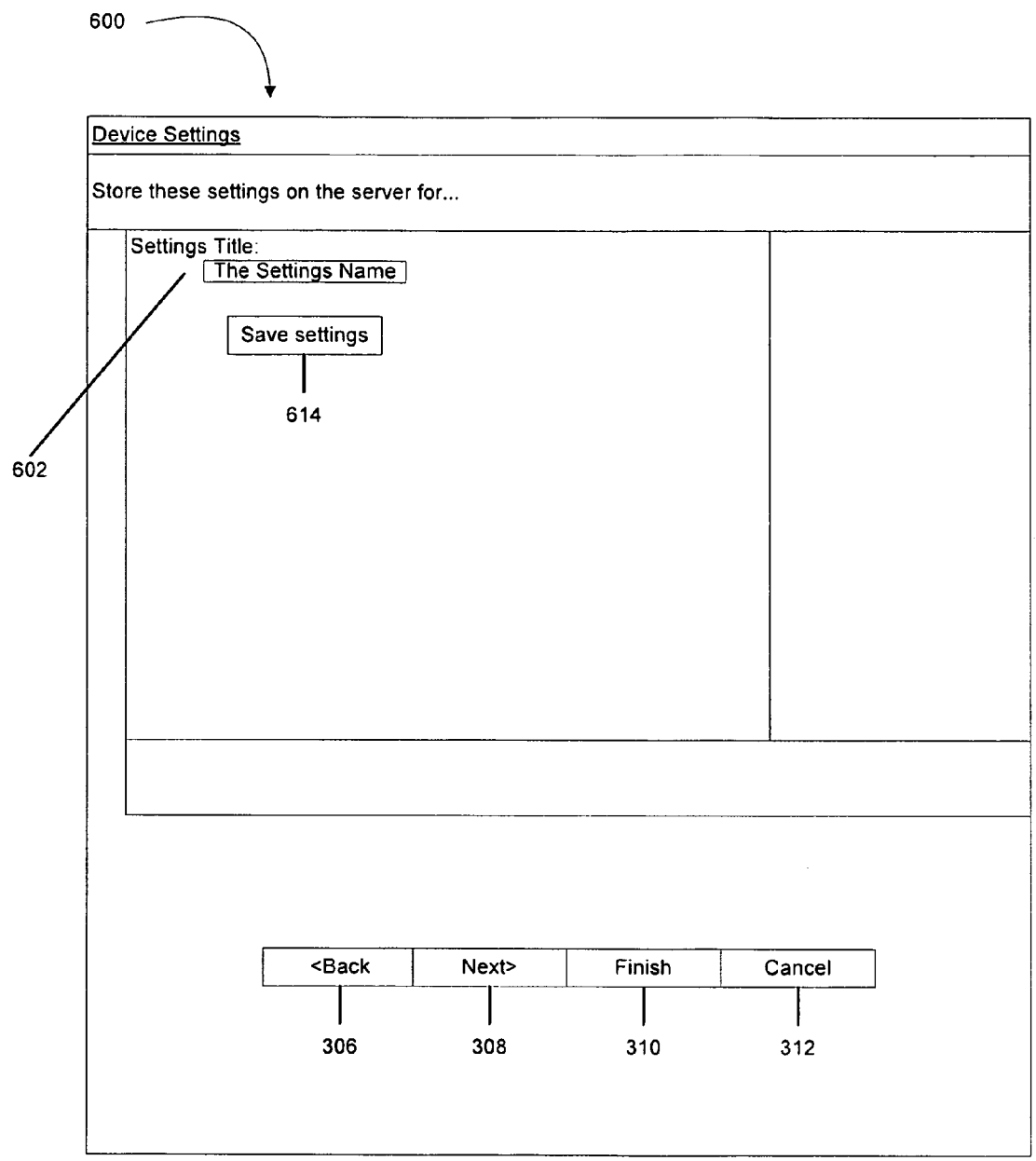
FIG. 6 shows another example interface through which a user may configure an NCPI device.

FIG. 6 illustrates the user interface screen 600 that has facilities configured to identify and store the new device configuration. As shown, the user interface screen 600 includes device configuration identifier 602, the device configuration storer 614 and the navigation elements 306, 308, 310 and 312. In one example, the finish element 310 is disabled by the user interface screen 600. The device configuration identifier 602 is configured to receive and display an identifier to be associated with the modified device configuration. In at least one example, this identifier is a configuration file name under which the data center management appliance 206 may locally store the modified device configuration. The device configuration storer 614 is configured to store the modified device configuration using its associated identifier when actuated by the user 202. In one example, the device configuration storer 614 is configured to store the device configuration as a configuration file on the data center management appliance 206.

Figure 7:
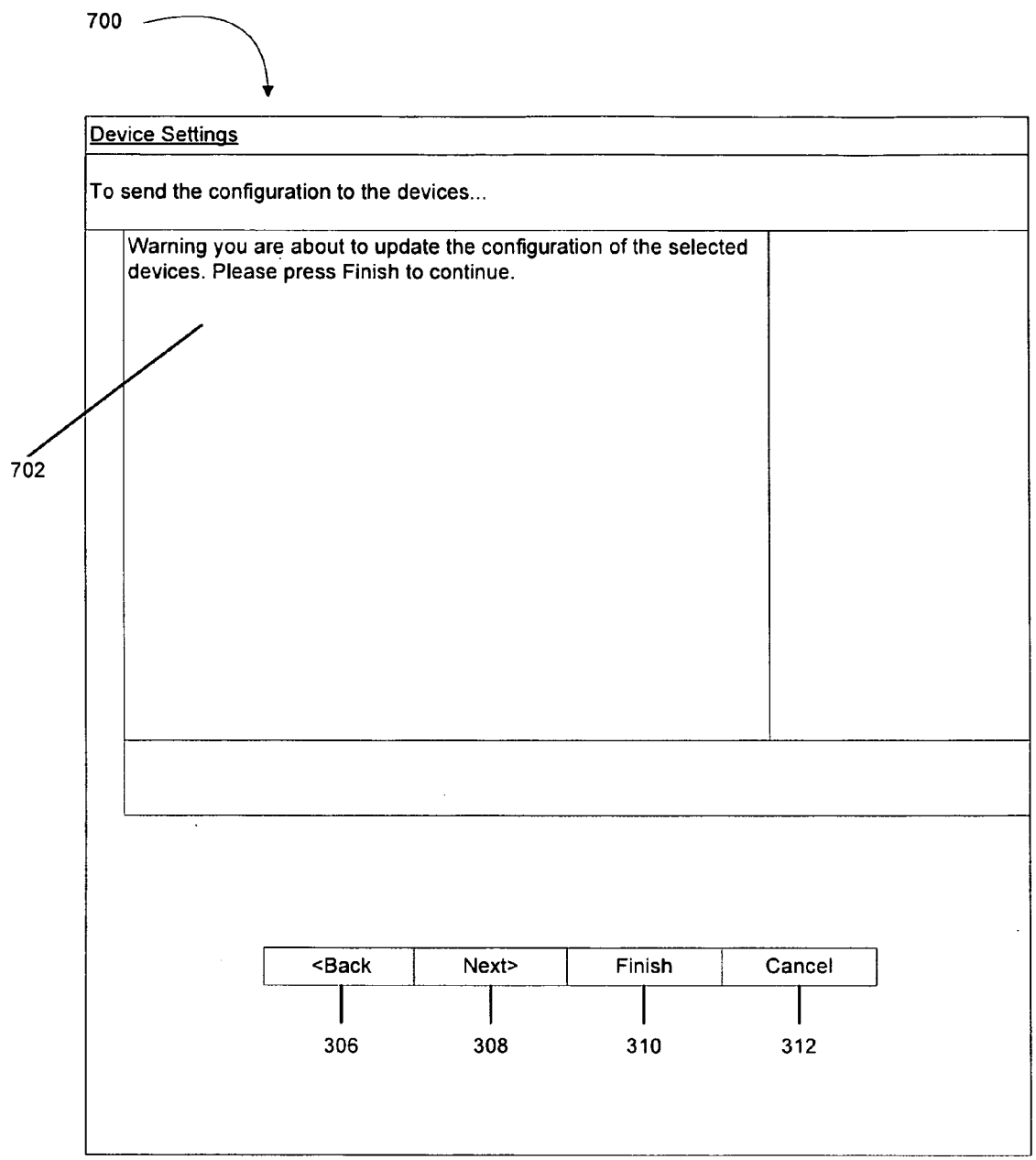
FIG. 7 depicts another example interface through which a user may configure an NCPI device.

FIG. 7 depicts the user interface screen 700 that includes facilities configured to provide the new device configuration to the NCPI devices selected for further processing. As shown, the user interface screen 700 includes message element 702 and the navigation elements 306, 308, 310 and 312. In one example, the finish element 310 is enabled by the user interface screen 700 and the next element 308 is disabled. The message element 702 is configured to display a variety of status messages regarding the distribution of the modified device configuration. These messages may include, among other messages, warning messages indicating that the modified device configuration is about to be provided to the NCPI devices selected for configuration in the user interface 300 and status messages indicating progress as the distribution occurs. In one example, the message element 702 may include a progress bar (not shown) configured to provide an indication of the progress of distribution of the modified device configuration to the NCPI devices selected for configuration.

Within the context of the user interface screen 700, the next element 308 includes additional facilities to provide the currently modified device configuration to the NCPI devices selected for configuration. In some examples, this provision may take the form of a configuration file transfer using a variety of protocols, such as FTP or secure FTP. In other examples, the modified device configuration may be provided using message based protocol, such as HTTP, and examples are not limited to any particular technique of providing device configurations.

The series of user interface screens illustrated above are a particular example and other examples in accord with the present invention exist. For instance, in one example, user interface screens 600 and 700 are combined into a single user interface screen. In another example, user interface screen 700 includes a NCPI device list similar to NCPI device list 304 which is configured to indicate NCPI devices to which the modified device configuration will be provided.

In still another example, the configuration interface screen 204 includes a user interface screen with facilities configured to receive, display and store device configuration policies. This user interface screen may be configured to accept a configuration policy identifier, under which the configuration policy may be stored, one or more characteristics of the NCPI devices to which the policy applies, a device configuration to apply to the NCPI device subject to the policy and one or more events that trigger policy application to applicable NCPI devices. Thus various examples of the configuration interface 204 provide increased flexibility to users in managing NCPI device configuration.

Configuration Processes

Figure 8:
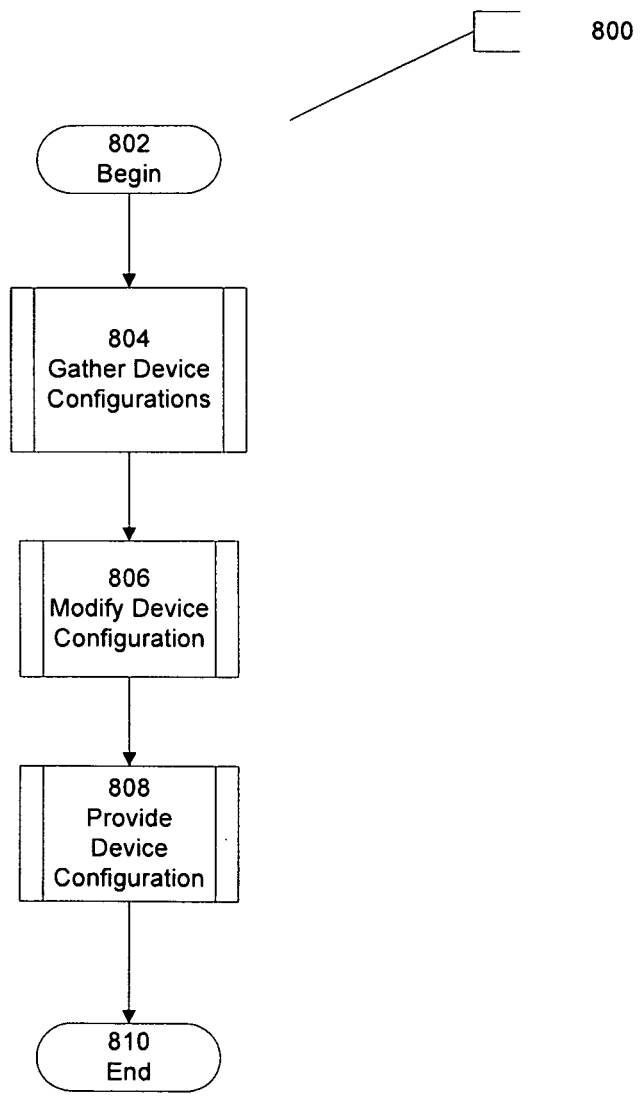
FIG. 8 shows an example for configuring an NCPI device.

Various examples provide processes for configuring NCPI devices within a data center. FIG. 8 illustrates one such process 800 that includes acts of gathering device configurations, modifying device configurations and providing device configurations. Process 800 begins at 802.

In act 804, NCPI device configurations are gathered. According to various examples, a data center management appliance may gather these device configurations from one or more NCPI devices. Acts in accord with these examples are discussed below with reference to FIG. 9.

In act 806, device configurations are modified. According to some examples, a user may modify device configurations that are stored locally on a data center management appliance. Acts in accord with these examples are discussed below with reference to FIG. 10.

In act 808, device configurations are provided. According to other examples, a data center management appliance may provide modified device configurations to NCPI devices. Acts in accord with these examples are discussed below with reference to FIG. 11.

Process 800 ends at 810. Configuration activities in accord with process 800 enable users to efficiently manage specialized configurations for NCPI devices while allowing users to build configurations based on pre-existing device configuration, thus decreasing the level of effort required. In addition, examples of process 800 included computer implemented configuration "wizards" that may guide users through the acts included in process 800.

Figure 9:
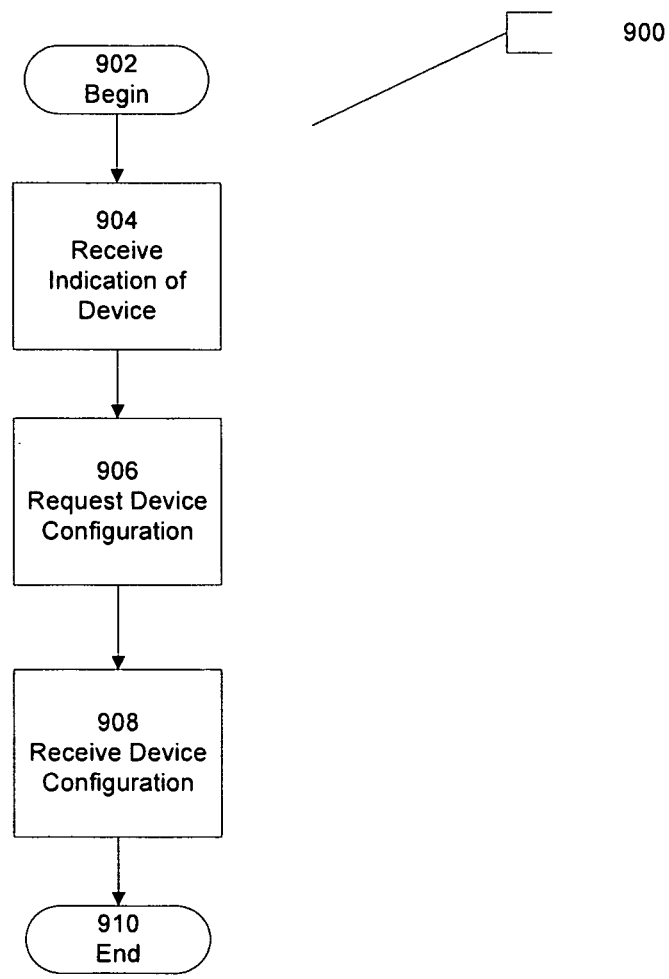
FIG. 9 illustrates another example process for configuring an NCPI device.

Various examples provide processes for gathering NCPI device configurations. FIG. 9 illustrates one such process 900 that includes acts of receiving an indication of an NCPI device, requesting the device configuration of the NCPI device and receiving the device configuration. Process 900 begins at 902

In act 904, a data center management appliance receives an indication of a particular NCPI device. In one example, the data center management appliance that receives the indication is a data center management appliance arranged and configured in accord with the data center management appliance 206 described above. In this example, the indication may be provided by a user entering information indicating the particular NCPI device. In another example, the data center management appliance 206 may detect the presence of the particular NCPI device via a network request made by the NCPI device upon installation of the device.

In act 906, a data center management appliance requests the device configuration of the particular NCPI device. In one example, the data center management appliance that requests the device configuration is a data center management appliance arranged and configured in accord with the data center management appliance 206 described above. In this example, the request may take the form of an FTP Get command sent to the NCPI device from the data center management appliance 206. However, the request may take other forms, e.g. an HTTP Post or a web service call, without departing from the scope of the present invention.

In act 908, a data center management appliance receives the device configuration from the particular NCPI device. In one example, the data center management appliance that receives the device configuration is a data center management appliance arranged and configured in accord with the data center management appliance 206 described above. In this example, the received device configuration may be stored locally on the data center management appliance 206.

Process 900 ends at 910.

Figure 10:
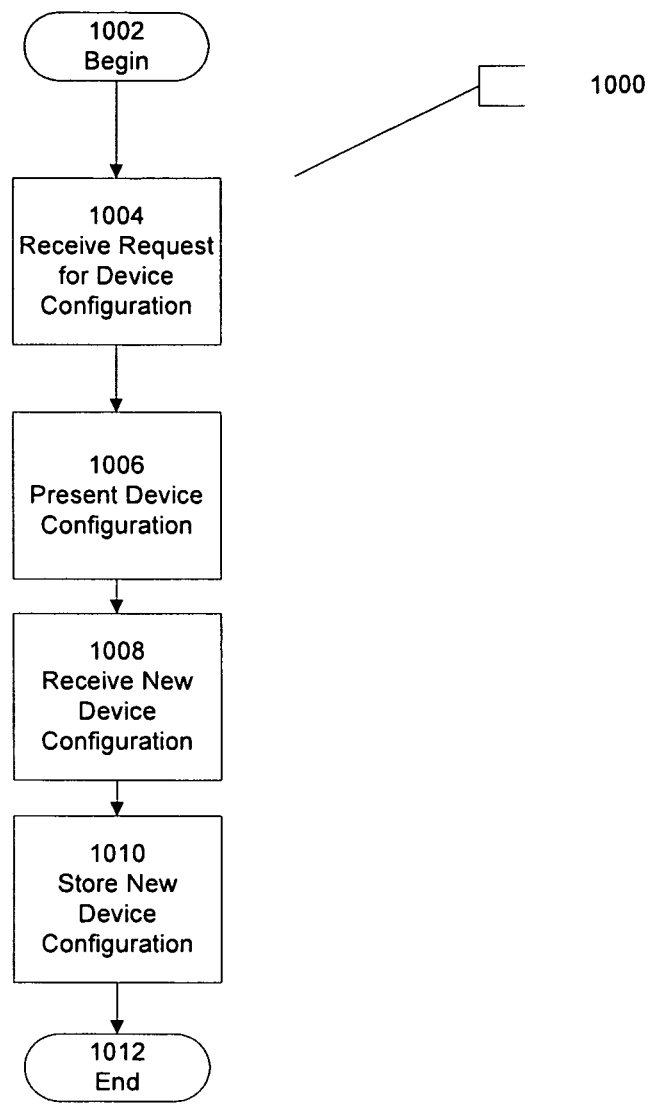
FIG. 10 depicts another example process for configuring an NCPI device.

Various examples provide processes for modifying NCPI device configurations. FIG. 10 illustrates one such process 1000 that includes acts of receiving a request for an NCPI device configuration, presenting the device configuration, receiving a new device configuration and storing the new device configuration. Process 1000 begins at 1002

In act 1004, a data center management appliance receives a request for a particular NCPI device configuration. In one example, the data center management appliance that receives the request is a data center management appliance arranged and configured in accord with the data center management appliance 206 described above. In this example, the request may be made by a user using a user interface such as the configuration interface 204 described above.

In act 1006, a data center management appliance presents the particular NCPI device configuration. In one example, the data center management appliance that presents the device configuration is a data center management appliance arranged and configured in accord with the data center management appliance 206 described above. In this example, the presentation may take the form of a displaying the NCPI device configuration in a user interface such as the configuration interface 204 described above.

In act 1008, a data center management appliance receives a new NCPI device configuration. In one example, the data center management appliance that receives the device configuration is a data center management appliance arranged and configured in accord with the data center management appliance 206 described above. In this example, the received device configuration may be a modified device configuration received via the configuration interface 204 described above.

In act 1010, a data center management appliance stores the new NCPI device configuration. In one example, the data center management appliance that stores the device configuration is a data center management appliance arranged and configured in accord with the data center management appliance 206 described above. In this example, the received device configuration may be stored locally on the data center management appliance 206 in the form of a configuration file.

Process 1000 ends at 1012.

Figure 11:
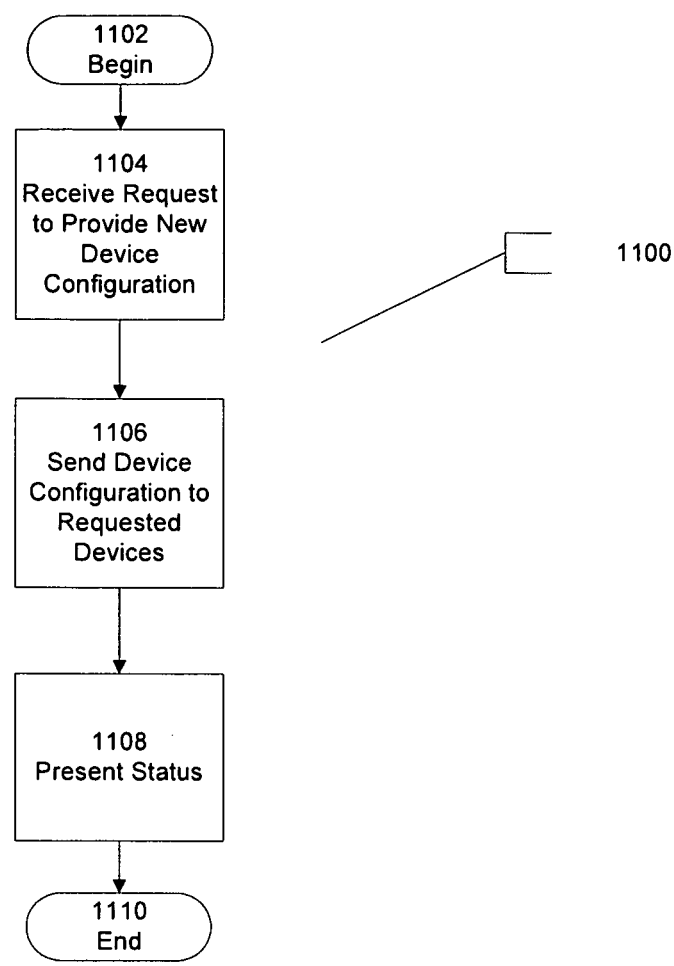
FIG. 11 shows another example process for configuring an NCPI device.

Various examples provide processes for providing NCPI device configurations. FIG. 11 illustrates one such process 1100 that includes acts of receiving a request to provide a new NCPI device configuration, sending the requested NCPI device configuration to the requested NCPI devices and presenting status. Process 1100 begins at 1102

In act 1104, a data center management appliance receives a request to provide a particular NCPI device configuration to a particular NCPI device. In one example, the data center management appliance that receives the request is a data center management appliance arranged and configured in accord with the data center management appliance 206 described above. In this example, the request may be provided by a user entering information indicating the particular NCPI device configuration and a particular NCPI device using a user interface, such as the configuration interface 204 described above.

In act 1106, a data center management appliance sends the requested NCPI device configuration to the particular NCPI device or devices. In one example, the data center management appliance that sends the device configuration is a data center management appliance arranged and configured in accord with the data center management appliance 206 described above. In this example, the device configuration may be sent using an FTP Put command executed by the data center management appliance 206. However, the device configuration may be sent using other techniques and protocols, e.g. an HTTP Post or a web service call, without departing from the scope of the present invention.

In act 1108, a data center management appliance presents the status of the provision of the device configurations to the NCPI devices. In one example, the data center management appliance that presents the status is a data center management appliance arranged and configured in accord with the data center management appliance 206 described above. In this example, the presentation of status may be made through a user interface, such as the configuration interface 204 described above.

Process 1100 ends at 1110.

Figure 12:
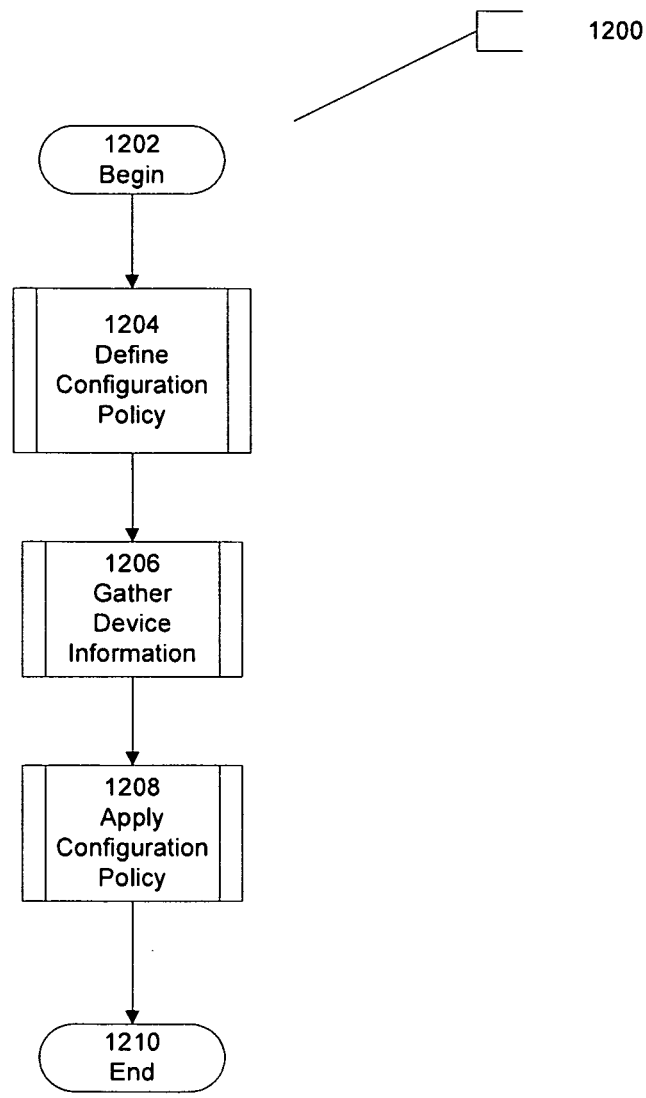
FIG. 12 illustrates another example process for configuring an NCPI device.

Various examples provide processes for configuring NCPI device configuration policies. FIG. 12 illustrates one such process 1200 that includes acts of defining a configuration policy, gathering NCPI device information and applying the configuration policy to NCPI devices. Process 1200 begins at 1202.

In act 1204, an NCPI device configuration policy is defined. According to various examples, a user may define this configuration policy using a data center management appliance. Acts in accord with these examples are discussed below with reference to FIG. 13.

In act 1206, NCPI device information is gathered. According to some examples, a data center management appliance may gather this device information. Acts in accord with these examples are discussed below with reference to FIG. 14.

In act 1208, the NCPI device configuration policy is applied. According to other examples, a data center management appliance may apply the device configuration policy to one or more NCPI devices. Acts in accord with these examples are discussed below with reference to FIG. 15.

Process 1200 ends at 1210. Configuration activities in accord with process 1200 enable users to setup configuration policies that automatically configure NCPI devices using flexible rules based on a wide variety of NCPI device characteristics, thus easing the burden associated with installation and maintenance of NCPI devices.

Figure 13:
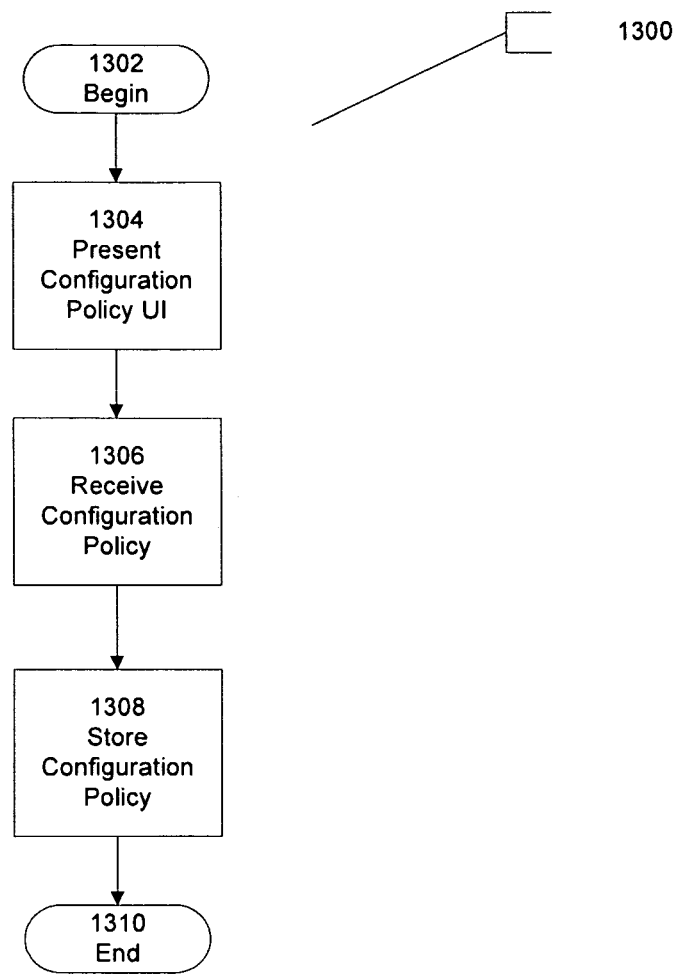
FIG. 13 depicts another example process for configuring an NCPI device.

Various examples provide processes for defining NCPI device configuration policies. FIG. 13 illustrates one such process 1300 that includes acts of presenting a configuration policy user interface, receiving a configuration policy and storing the configuration policy. Process 1300 begins at 1302

In act 1304, a data center management appliance presents a configuration policy user interface. In one example, the data center management appliance that presents the configuration policy user interface is a data center management appliance arranged and configured in accord with the data center management appliance 206 described above. In this example, the configuration policy user interface may include facilities configured to allow the user to indicate an identifier for the configuration policy, a device configuration to associate with the configuration policy and one or more characteristics of NCPI devices to which the configuration should apply. As discussed above, the characteristics whose presence or absence determines the applicability of a particular policy may be varied and include, among others, the functional type of NCPI device and the logical and physical location of the NCPI device.

In act 1306, a data center management appliance receives an NCPI device configuration policy. In one example, the data center management appliance that receives the configuration policy is a data center management appliance arranged and configured in accord with the data center management appliance 206 described above. In this example, the policy may be received from a user entering information into the configuration policy user interface described above.

In act 1308, a data center management appliance stores the device configuration policy. In one example, the data center management appliance that stores the device configuration is a data center management appliance arranged and configured in accord with the data center management appliance 206 described above. In this example, the received configuration policy may be stored locally on the data center management appliance 206.

Process 1300 ends at 1310.

Figure 14:
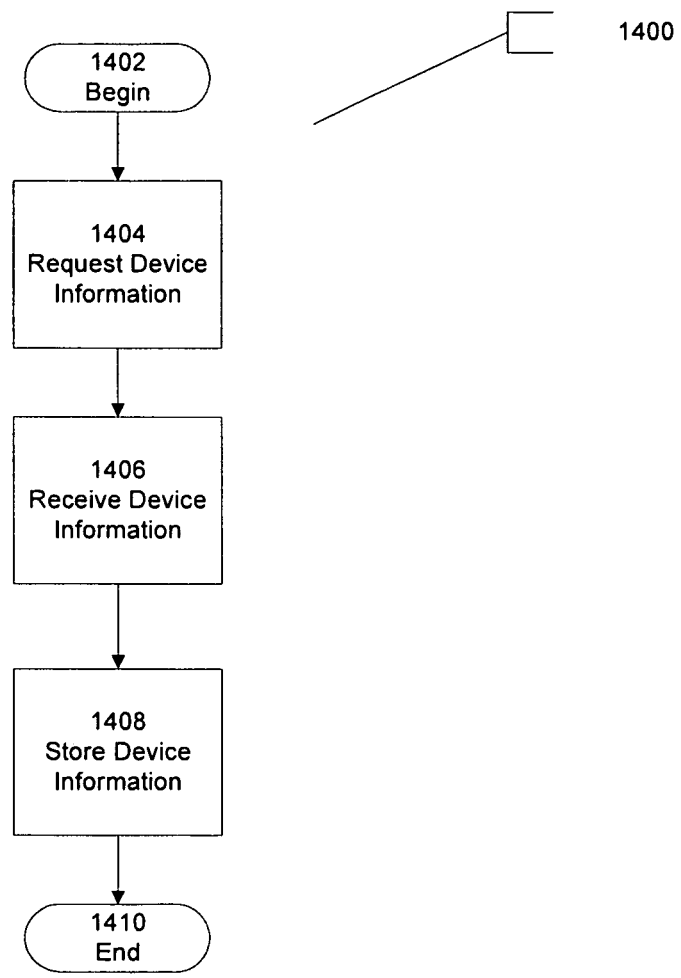
FIG. 14 shows another example process for configuring an NCPI device.

Various examples provide processes for gathering NCPI device information. FIG. 14 illustrates one such process 1400 that includes acts of requesting NCPI device information, receiving NCPI device information and storing NCPI device information. Process 1400 begins at 1402

In act 1404, a data center management appliance requests device information for NCPI devices. In one example, the data center management appliance that requests the device information is a data center management appliance arranged and configured in accord with the data center management appliance 206 described above. In this example, the request may be made to a user via a user interface configured to receive NCPI device characteristics. The device characteristics that may be requested via the user interface include any device characteristics needed to determine the applicability of device configuration policies and thus may include, among other characteristics, the functional type of NCPI device and the logical and physical location of the NCPI device. In another example, the data center management appliance 206 may request the characteristics directly from the NCPI devices via the network 208 using a variety of known protocols and techniques.

In act 1406, a data center management appliance receives the NCPI device information. In one example, the data center management appliance that receives the device information is a data center management appliance arranged and configured in accord with the data center management appliance 206 described above. In this example, device information may be received via the user interface described above or in response to the requests made via the network 208.

In act 1408, a data center management appliance stores the NCPI device information. In one example, the data center management appliance that stores the device information is a data center management appliance arranged and configured in accord with the data center management appliance 206 described above. In this example, the device information may be stored locally on the data center management appliance 206.

Process 1410 ends at 1412.

Figure 15:
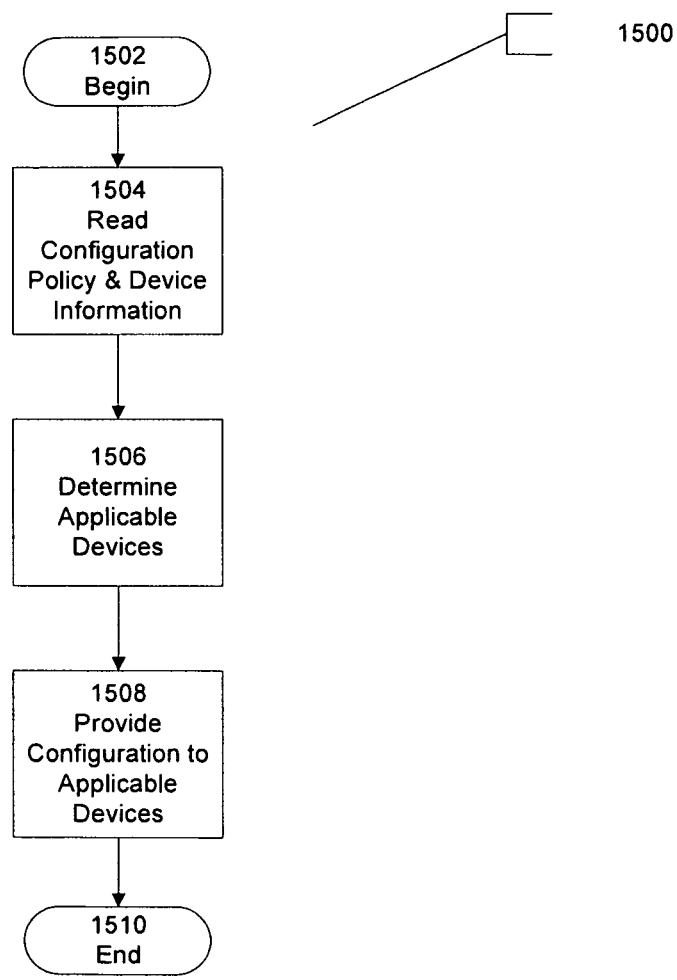
FIG. 15 illustrates another example process for configuring an NCPI device.

Various examples provide processes for applying NCPI device configuration policies. FIG. 15 illustrates one such process 1500 that includes acts of reading NCPI device information and at least one NCPI device configuration policy, determining NCPI devices that are subject the configuration policy and providing the NCPI device configuration associated with the applicable configuration policy to the devices subject to the configuration policy. Process 1500 begins at 1502

In act 1504, a data center management appliance reads an NCPI device configuration policy and a set of NCPI device information. In one example, the data center management appliance that reads the device and policy information is a data center management appliance arranged and configured in accord with the data center management appliance 206 described above. In this example, the information may be read into the memory of the data center management appliance for further processing.

In act 1506, a data center management appliance determines which NCPI devices are subject to the configuration policy. In one example, the data center management appliance that makes this determination is a data center management appliance arranged and configured in accord with the data center management appliance 206 described above. In this example, the data center management appliance 206 may determine which NCPI devices are subject to the device configuration policy by comparing and matching the device characteristics targeted by the configuration policy with the device characteristics read into memory, as described above.

In act 1508, a data center management appliance provides the device configuration associated with the applicable NCPI device configuration policy to the NCPI devices subject to the configuration policy. In one example, the data center management appliance that provides the device configuration is a data center management appliance arranged and configured in accord with the data center management appliance 206 described above. In this example, the provision may take the form of an FTP Put command, or via other techniques and protocols, as described above.

Process 1500 ends at 1510.

Each of processes 800, 900, 1000, 1100, 1200, 1300, 1400 and 1500 depicts one particular sequence of acts in a particular example. The acts included in each of these processes may be performed by, or using, one or more computer systems specially configured as discussed herein. Some acts are optional and, as such, may be omitted in accord with one or more examples. Additionally, the order of acts can be altered, or other acts can be added, without departing from the scope of the present invention. As discussed above, in at least some examples, the acts deal with data representative of tangible objects. In addition, as discussed above, in at least one example, the acts are performed on a particular, specially configured machine, namely a data center management appliance.

Any references to examples or elements or acts of the systems and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements.

Any example disclosed herein may be combined with any other example, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. Such terms as used herein are not necessarily all referring to the same example. Any example may be combined with any other example in any manner consistent with the aspects disclosed herein. References to "or" may be construed as inclusive so that any terms described using "or" may indicate any of a single, more than one, and all of the described terms.

Where technical features in the drawings, detailed description or any claim are followed by references signs, the reference signs have been included for the sole purpose of increasing the intelligibility of the drawings, detailed description, and claims. Accordingly, neither the reference signs nor their absence have any limiting effect on the scope of any claim elements.

Having now described some illustrative aspects of the invention, it should be apparent to those skilled in the art that the foregoing is merely illustrative and not limiting, having been presented by way of example only. Similarly, aspects of the present invention may be used to achieve other objectives. Numerous modifications and other illustrative examples are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

What is claimed is:

1. A method for configuring a network critical physical infrastructure (NCPI) device using a data center management appliance, the method comprising:

gathering, by the data center management appliance, at least one device configuration from a first NCPI device via a network, the first NCPI device being of a first functional type that supplies either power or cooling to equipment in a data center;

modifying the at least one device configuration;

providing the modified at least one device configuration to the first NCPI device via the network; and providing the modified at least one device configuration to a second NCPI device via the network, the second NCPI device being of a second functional type that supplies either power or cooling to the equipment in the data center, the second functional type being different from the first functional type, wherein providing the modified at least one device configuration to the second NCPI device includes providing the modified at least one device configuration to a computer room air conditioner and providing the modified at least one device configuration to the first NCPI device includes providing the modified at least one device configuration to a uninterruptible power supply (UPS).

2. The method according to claim 1, wherein gathering, by the data center management appliance, the at least one device configuration includes copying at least one configuration file from the first NCPI device.

3. The method according to claim 1, wherein gathering, by the data center management appliance, the at least one device configuration from the first NCPI device includes gathering the at least one device configuration from a UPS.

4. The method according to claim 1, further comprising storing the modified at least one device configuration in data storage.

5. The method according to claim 1, further comprising providing the modified at least one device configuration to a power distribution unit (PDU).

6. The method according to claim 5, wherein providing the modified at least one device configuration to the UPS includes providing a configuration file including operational parameters common to the UPS and the PDU.

7. A system comprising:
a first network critical physical infrastructure (NCPI) device in data communication with a network, the first NCPI device being a first functional type that supplies either power or cooling to equipment in a data center;
a second NCPI device in data communication with the network, the second NCPI device being of a second functional type that supplies either power or cooling to the equipment in the data center, the second functional type being different from the first functional type; and
a data center management appliance for configuring NCPI devices, the appliance comprising:
a storage medium;
a network interface in data communication with the network; and
a controller coupled to the storage medium and the network interface and configured to:
gather at least one device configuration from the first NCPI device via the network interface;
modify the at least one device configuration;
provide the modified at least one device configuration to the first NCPI device via the network interface; and
provide the modified at least one device configuration to the second NCPI device via the network interface,
wherein the second NCPI device includes a computer room air conditioner and the first NCPI device includes an uninterruptible power supply (UPS).

8. The system according to claim 7, wherein the controller is further configured to copy at least one configuration file from the first NCPI device.

9. The system according to claim 7, wherein the controller is further configured to gather the at least one device configuration from a UPS.

10. The system according to claim 7, wherein the controller is configured to store the modified at least one device configuration on the storage medium.

11. The system according to claim 7, wherein the controller is further configured to provide a configuration file including operational parameters common to a UPS and a PDU.

12. A method for automatically configuring a network critical physical infrastructure (NCPI) device using a data center management appliance, the method comprising:
defining a configuration policy, the configuration policy having an associated NCPI device configuration;
determining, by the data center management appliance, at least one NCPI device subject to the NCPI device configuration policy, the at least one NCPI device being of a first functional type that supplies either power or cooling to equipment in a data center;
providing the associated NCPI device configuration to the at least one NCPI device subject to the NCPI device configuration policy; and
providing the associated NCPI device configuration to another NCPI device subject to the NCPI device configuration policy and being of a second functional type that supplies either power or cooling to the equipment in the data center, the second functional type being different from the first functional type,
wherein providing the associated NCPI device configuration to the at least one NCPI device includes providing the associated NCPI device configuration to a uninterruptible power supply (UPS) and providing the associated NCPI device configuration to the another NCPI device includes providing the associated NCPI device configuration to a computer room air conditioner.

13. The method according to claim 12, wherein defining the configuration policy includes defining a configuration policy applicable to the at least one NCPI based on the physical location of the at least one NCPI device.

14. The method according to claim 12, wherein providing the associated NCPI device configuration includes copying at least one configuration file to the at least one NCPI device.

15. The method according to claim 12, further comprising providing the associated NCPI device configuration to a power distribution unit.

16. The method according to claim 12, wherein defining the configuration policy includes specifying an event an occurrence of which triggers application of the configuration policy and the method further comprises determining that the event has occurred prior to performing the act of determining, by the data center management appliance, the at least one NCPI device subject to the NCPI device configuration policy.

17. The method according to claim 12, wherein defining the configuration policy includes defining a configuration policy applicable to at least two NCPI devices being of different functional types.

18. The method according to claim 17, wherein defining the configuration policy applicable to the at least two NCPI devices includes defining a configuration policy that is applicable to a UPS and a computer room air conditioner.

* * * * *